March 29, 1966 G. R. REED 3,242,754
TRANSMISSION
Filed Sept. 16, 1963 2 Sheets-Sheet 1

United States Patent Office 3,242,754
Patented Mar. 29, 1966

3,242,754
TRANSMISSION
George R. Reed, Lambertville, Mich., assignor, by mesne assignments, to Safety Electrical Equipment Corporation, Hamden, Conn., a corporation of Connecticut
Filed Sept. 16, 1963, Ser. No. 309,005
20 Claims. (Cl. 74—421)

This invention relates to transmissions in general and more specifically to a transmission having a case and a shaft rotatably mounted therein and including a gear positioned within the case and mounted for unitary rotation on the shaft and means rotatably mounting the shaft in the case and wherein, in the absence of the shaft, the remaining transmission subassembly includes means for maintaining the gear in its proper position in the case.

This general type of transmission has found widespread use such as in the railway industry where it is adapted to drive an axle shaft of a railway car. In such an installation, the transmission case cicumferentially surrounds an intermediate portion of the axle shaft, the axle shaft being the shaft rotatably mounted in the case by a pair of spaced bearing assemblies, while an axle driving gear is drivingly mounted on the axle shaft between the bearing assemblies and is in turn driven by a prime mover through a suitable driving arrangement. Inadequate means are present to maintain the driving gear in its proper position in the absence of the axle shaft.

Such prior art transmissions present costly and difficult problems in the installation of the axle shaft. These problems arise since the manufacturer of the railway cars and axles normally is not the manufacturer of the transmission, and purchases the latter and assembles the same on the axle shafts.

The prior art transmission manufacturer, after all the transmission components are completed, assembles the transmission subassembly on a dummy axle shaft for testing purposes. Upon removal of the dummy axle shaft, since there are no means properly positioning the axle drive gear other than the axle shaft, a dummy shaft in the form of a wooden block or the like is inserted in the transmission subassembly to position the gear for shipment to the railway car manufacturer for assembly on the axle shaft. Since upon removal of the dummy shaft the drive gear is no longer properly positioned within the case, the transmission subassembly as a unit cannot be pressed onto the axle. Accordingly, the car manufacturer must disassemble the transmission, mount the gear and the bearings on the axle shaft, and assemble the balance of the transmission about the axle shaft. This duplication of assembly operations and the undesirable disassembly adds to the cost of the final product and wastes valuable time, effort and equipment.

Therefore, it is an object of this invention to provide a transmission subassembly of the type described above which does not have to be disassembled to be mounted on a shaft.

It is another object of this invention to provide such a transmission subassembly wherein a portion of the subassembly maintains the shaft mounted gear in its operative position in the absence of the shaft.

It is yet another object of this invention to provide such a transmission subassembly having the drive gear mounted therein so that after the transmission subassembly has been assembled the drive gear may be positioned on the shaft carrying the same without disassembling the transmission.

It is a further object of this invention to provide a transmission having a case portion and a shaft rotatably disposed in said case portion and a drive gear mounted on said shaft for unitary rotation therewith and including means mounting the shaft in the case portion which means are operative to support the drive gear in its proper position in the absence of the shaft.

Further and other objects of this invention will become apparent upon a consideration of the detailed specification taken in view of the drawings wherein.

One preferred embodiment of this invention has been incorporated in a parallel-drive unit for a railway car axle wherein the axle shaft is adapted to drive the railway car. The transmission includes a case having an input shaft rotatably mounted therein and disposed in parallel relationship with the axle shaft extending through the case and having an input gear thereon drivingly meshed with an output gear pressed on the axle shaft. A pair of spaced bearing assemblies are disposed on opposed sides of the output gear with the inner races thereof pressed on the axle shaft and the outer races thereof carried by the case and an annulus of tapered rollers disposed between the races so that the axle shaft is rotatably mounted in the case. With prior art structures, if the axle shaft was now removed, the output gear would be free to move radially from its proper position so that it would be difficult to insert the axle shaft in the gear and in the bearing assemblies for mounting the same. In this preferred embodiment, a portion of each of the inner races of the bearing assemblies engages the output gear and maintains the same in its desired radial position so that the axle shaft can be easily inserted in the properly positioned gear and bearing assemblies. The inner races also abut the opposed sides of the output gear so that a pressing load can be placed on the gear through the races to press it onto the axle shaft.

In another embodiment of this invention, instead of a portion of the bearing assemblies being in engagement with the output gear, portions of the remainder of the case assembly on opposed axial sides of the gear project axially inwardly and closely overlie portions of the gear and are operative to engage the gear upon radial movement thereof, thereby maintaining the latter in its proper position in the absence of the axle shaft.

Figure 1:
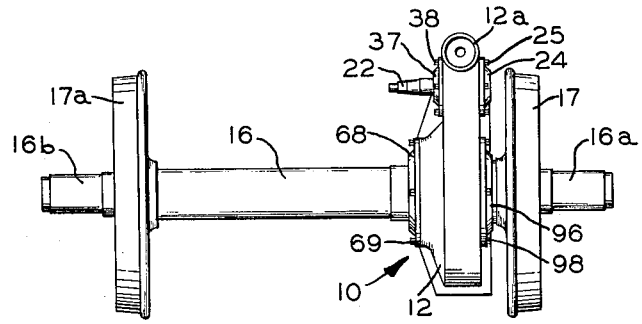
FIG. 1 is a plan view of a transmission according to this invention incorporating an axle shaft.
Figures 3, 4:
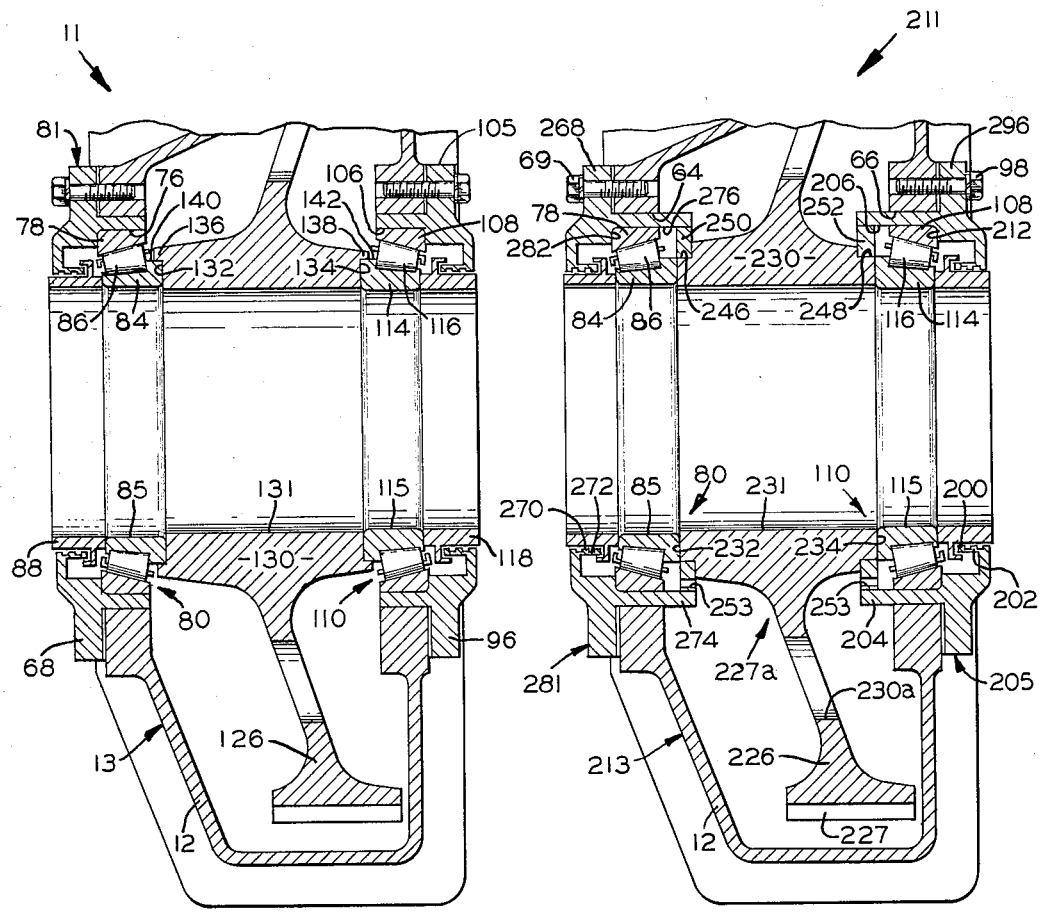
FIG. 3 is a view according to FIG. 2 of the transmission subassembly before the axle shaft has been assembled therein.
FIG. 4 is a view according to FIG. 3 of another embodiment of this invention.
Figure 2:
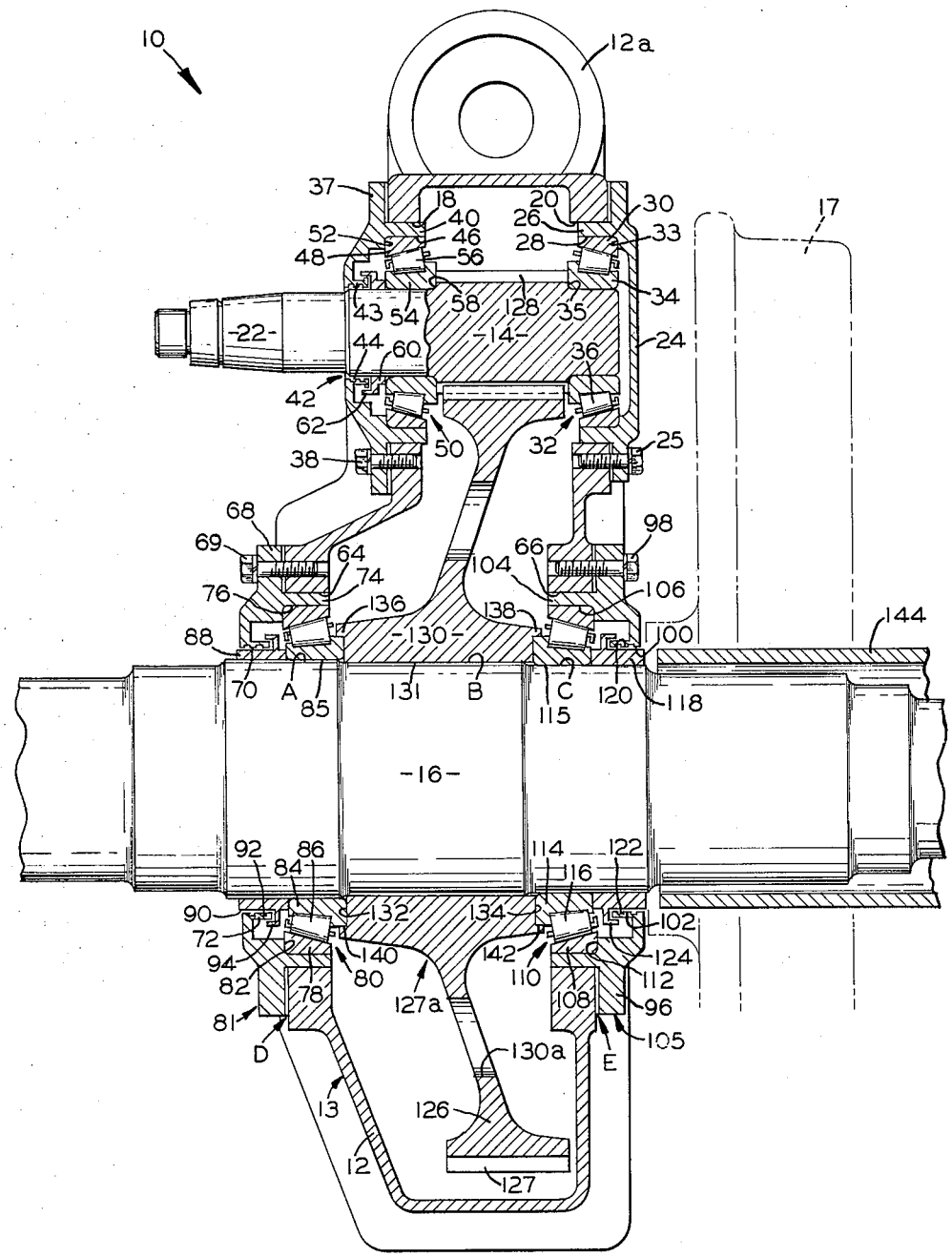
FIG. 2 is a sectional view of the transmission shown in FIG. 1.

Referring to FIGS. 1–3 of the drawings wherein the first embodiment is shown, a parallel drive transmission 10, including a housing or case portion 12 adapted to be secured to a railway car (not shown) at a boss 12a, has an input shaft 14 and an output shaft in the form of an axle shaft 16 rotatably mounted therein in parallel spaced-apart relationship. The input shaft 14 is disposed in a pair of aligned openings or bores 18 and 20 in the case portion 12 and the left end 22 thereof extends beyond the case portion and is suitably adapted to be drivingly connected to a prime mover (not shown). A bearing cap 24 is secured to the case portion 12 by a plurality of bolts 25 and completely covers the bore 20 and has an annular flange portion 26 extending axially into and engaging the bore 20. The flange 26 is counterbored as shown at 28, which counterbore receives the outer race 30 of a bearing assembly 32, while a shoulder 33 at the outer end of the counterbore engages the outer end of the race 30 to prevent movement thereof to the right. An inner race 34 of the bearing assembly 32, between which and the race 30 is disposed an annulus of caged tapered rollers 36, is pressed on the right end of the shaft 14 and against a shoulder 35 thereon, whereby the shaft is rotatably mounted in the bore 20 of the case portion 12, and movement to the right of the shaft is inhibited.

A bearing cap 37 is secured to the portion of the case 12 surrounding the bore 18 by a plurality of bolts 38 and has an annular flange 40 extending axially into the bore 18 and engaging the same. The bearing cap 37 has a central opening 42 therein bounded by an axially inwardly extending annular flange 43 through which the left end 22 of the shaft 14 extends. The inner surface of the flange 43 closely surrounds the shaft 14 and is provided with a plurality of axially spaced grooves 44 which inhibit the flow of lubricant between the shaft and the flange 43.

The flange 40 is provided with a counterbore 46 which receives an outer race 48 of a bearing assembly 50, and is provided with a shoulder 52 at the left end of the bore 46 which engages the left end of the race 48 and prevents movement thereof to the left. An inner race 54 of the bearing assembly 50, between which and the race 48 is disposed an annulus of caged tapered rollers 56, is pressed on the shaft 14 and against a shoulder 58 thereon whereby the shaft 14 is rotatably mounted in the bore 18 and movement thereof to the left is inhibited. An annular sealing ring 60 is sealingly pressed on the shaft 14 at a position to the left of the race 54 and has an annular lip 62 thereon which overlies the flange 43 so as to form a labyrinth seal therebetween which inhibits lubricant in the case from reaching the opening 42 and thereby escaping from the case.

The output or axle shaft 16 is disposed within access means in the form of bores 64 and 66 in the case portion 12 and projects axially beyond both sides thereof. The right end 16a of shaft 16 is reduced in size and adapted to be suitably rotatably mounted in a railway car (not shown). Between the case 12 and the end 16a, a wheel 17 is pressed on the shaft. The left end 16b of shaft 16 is also reduced in size and adapted to be suitably rotatably mounted in a railway car. A second wheel 17a is pressed on the shaft 16 adjacent its left end 16b and the portion of the shaft 16 between the case 12 and wheel 17a is also reduced in size.

A bearing cap 68 is secured to the portion of the case 12 surrounding the access means formed by the bore 64 by a plurality of bolts 69 and has an axially extending central shaft receiving opening 70 therein bounded by an axially inwardly extending annular flange 72 through which opening the shaft 16 extends. A second annular flange 74 on the cap 68 extends axially inwardly and is received in the bore 64 of the case 12. A counterbore 76 is formed in the flange 74 and an outer race 78 of a bearing assembly 80 is pressed into the counterbore and against a shoulder 82 at the left end of the counterbore which limits leftward movement of the race 78. An inner race 84 of the bearing assembly 80, between which and the outer race 78 is an annulus of caged tapered rollers 86, has a central shaft receiving opening 85 and is pressed onto the shaft 16 so that the shaft 16 is rotatably mounted in the left side of the case portion 12 by a mounting means 81 which includes the bearing cap 68 and bearing assembly 80.

An annular sealing member 88 is sealingly pressed on the shaft 16 to the left of and in abutting engagement with the inner race 84 and the periphery 90 thereof is closely spaced from the internal surface of the flange 72, which surface is provided with a plurality of axially spaced grooves 92 so that lubricant is inhibited from flowing between the member 88 and the flange 72. The sealing member 88 is also provided with an annular lip 94 which closely overlies the flange 72 forming a labyrinth seal to inhibit the flow of lubricant therebetween. When the shaft 16 is not positioned in the case portion 12, radial engagement between the lip 94 and flange 72 maintains the sealing member 88 in its proper radial position.

A bearing cap 96 is secured to the portion of the case 12 surrounding the access means formed by the bore 66 by a plurality of bolts 98 and has an axially extending shaft receiving opening 100 bounded by an axially inwardly extending annular flange 102, through which opening the shaft 16 extends. A second annular flange 104 on the cap 96 extends inwardly and is received in the bore 66 and a counterbore 106 is formed in the flange 104 which receives an outer race 108 of a bearing assembly 110 and has a shoulder 112 at the right end thereof which engages the race 108 and limits movement thereof to the right. An inner race 114 of the bearing assembly 110 has a central shaft receiving opening 115 and is coaxial with and axially spaced from the race 84. The inner race 114 is pressed on the shaft 16 and an annulus of caged tapered rollers 116 is disposed between the races 108 and 114 whereby the shaft 16 is rotatably mounted in the right side of the case portion 12 by a mounting means 105 which includes the bearing cap 96 and the bearing assembly 110. The combined structure of the case portion 12 and the mounting means 81 and 105 shall hereinafter be referred to as the case assembly 13.

An annular sealing member 118 is sealingly pressed on the shaft 16 to the right of and in abutting engagement with the inner race 114 and the periphery 120 thereof is closely spaced from the internal surface of the flange 102, which internal surface is provided with a plurality of axially spaced grooves 122 so that lubricant is inhibited from flowing between the member 118 and the flange 102. The sealing member 118 is provided with an annular lip 124 closely overlying the flange 102 to form a labyrinth seal which inhibits the flow of lubricant therebetween. When the shaft 16 is not positioned in the case portion 12, the radial engagement between the lip 124 and flange 102 maintains the sealing member 118 in its proper radial position.

Intermediate the bearing assemblies 80 and 110, and coaxial therewith, a torque transmitting element in the form of an output shaft gear 126 is disposed in the case assembly and is pressed on the shaft 16. The output gear 126 is meshed with an input gear 128 formed integrally on the medial portion of the shaft 14, so that the input and output shafts 14 and 16 are drivingly connected. The gear 126 has a peripheral toothed portion 127 and a body portion 127a including an axially elongated hub 130 connected to the toothed portion by a web 130a and having a bore 131. A left end 132 of the hub 130 abuttingly engages the right end of the inner race 84 of the bearing assembly 80 and a right end 134 of the hub abuttingly engages the left end of the inner race 114 of the bearing assembly 110, maintaining the inner races in axially spaced apart relationship and which engagement axially positions the gear. Engaging means are carried by the gear 126 and the races 80 and 110 of the mounting means 81 and 105 for maintaining the gear and races in a coaxial relationship. More particularly, the radially outer portions of the left and right ends 132 and 134 of the hub 130 are formed as axially outwardly extending annular flanges 136 and 138 respectively, which flanges closely overlie peripheral shoulders 140 on the inner race 84 and 142 on the inner race 114 respectively. The flanges 136 and 138 and the shoulders 140 and 142 are carried by the hub 130 and the races 84 and 114 respectively at a position radially outwardly from the central openings 131, 85 and 115 therein. As shown, the flanges 136 and 138 are formed integrally with the hub 130; however, these can be formed separately and suitably secured to the hub as by pressing on, welding and the like.

When the shaft 16 is not positioned in the access means provided by bores 64 and 66 in the case portion 12, as illustrated by the transmision subassembly 11 shown in FIG. 3, the outer races 78 and 108 of the bearing assemblies 80 and 110 are positioned by their engagement with the bores 76 and 106 of the bearing caps 68 and 96 respectively, the inner races 84 and 114 and caged rollers unitarily movable therewith are held against the outer races 78 and 108 by the end faces 132 and 134 of hub 130, and the inner races 84 and 114 of the bearing assemblies properly position the gear 126 both axially by engagement between the ends 132 and 134 of the hub 130 and the races, and radially, by the engagement between the flanges 136 and 138 of the hub and the peripheral shoulders 140 and 142 of the inner races 84 and 114 respectively. Since the gear 126 and bearing assemblies 80 and 110 are thus properly coaxially and axially positioned, the transmission manufacturer can ship this subassembly 11 to the railway car manufacturer without inserting a dummy shaft therein and the latter can position this subassembly on the axle shaft without disassembling the same in a manner to be now described.

The shaft 16 is preferably formed with at least three different diameters. A diameter indicated at A which carries the inner race 84 and the sealing member 88, a diameter indicated at B which carries the gear 126, and a diameter indicated at C which carries the inner race 114 and the seal member 118. The diameter of the remaining portion of the shaft 16 to the left of the sealing member 88 is immaterial for the purposes of this invention, but normally is as shown in FIG. 1 and as previously described; however, the diameter of the remaining portion of the shaft to the right of the sealing member 118 is preferably at least slightly smaller than the diameter C; however, a diameter equal to that shown at C will also be operative but will cause more difficulty in pressing on the bearing assembly 110.

The internal diameters of the sealing member 88 and inner race 84 are prepared so as to assume a pressed fit engagement with the diameter A of the shaft 16; the desired amount of press fit being approximately .003 to .005 inch. The diameter B of the shaft 16 is prepared so that it is slightly smaller than the internal diameters of the member 88 and race 84 and the internal diameter of the gear 126 is prepared so as to assume a pressed fit driving engagement of approximately .007 to .009 inch with the shaft at diameter B. The driving engagement between the shaft 16 and gear 126 may alternately if desired be a splined or keyed engagement. Diameter C of the shaft 16 is slightly smaller than the bore 131 of gear 126 and the internal diameters of the sealing member 118 and the inner race 114 are prepared so as to assume a pressed fit engagement of approximately .003 to .005 inch with the shaft at diameter C.

To position the shaft 16 into the transmission subassembly shown in FIG. 3, the right end of the shaft is inserted from the left end of the assembly and the diameter C thereof freely passes through the member 88, race 84 and gear 126 without engaging the same, and diameter B passes through the member 88 and the race 84 without engaging the same. Final positioning of the shaft 16 is accomplished by applying a load, in a leftward direction relative to the shaft 16, on the right end of the sealing member 118 by means of an annular anvil 144 freely slidable over the shaft 16. Since the sealing member 118 axially engages the inner race 114 which in turn axially engages the end 134 of the hub 130, and the end 132 of the hub 130 engages the inner race 84 which in turn engages the sealing member 88, the anvil 144 is operative to simultaneously press the above onto the shaft 16 until they are properly positioned as previously described. To remove the shaft 16 from the subassembly 11, a load is applied, toward the right relative to the shaft 16, by the anvil 144 on the left end of sealing member 88 and continued until the members 88 and 118, races 84 and 114 and gear 126 are pressed off of the shaft.

The annular flanges 136 and 138 are preferably spaced from the peripheral shoulders 140 and 142 of the inner races 84 and 114 respectively by approximately .005 to .055 inch. This spacing is desired, since as explained above, during the pressing of the race 114 onto the diameter C of the shaft 16, the outer diameter of the inner race 114 will be expanded, and since the right end of the bore 131 of hub 130 is not as yet being pressed on the diameter B of the shaft and expanded thereby, if tolerance were not allowed between the flange 138 and the shoulder 142, the flange would engagingly interfere with the expansion of the race. When the shaft 16 is not positioned in the transmission subassembly 11, the gear 126 and bearing assemblies 80 and 110 assume substantially a coaxial relationship; the gear 126 being from .005 to .055 inch from absolute coaxiality. Accordingly, for the purpose of this invention, the term "coaxial" includes such slight variations from absolute coaxiality.

The spacing between the flanges 136 and 138 and the races 84 and 114 respectively can be increased somewhat above .055 inch if desired; however, to do so will require the provision of a larger tapered lead-in at the left ends of the central openings 131 and 85 in the gear 126 and race 84 respectively to centralizingly accommodate the shaft 16 during the assembly operation, since the gear 126 will be more greatly displaced from a coaxial relationship with the bearing assemblies 80 and 110. Since such an increase in lead-in will decrease the surface area of contact between the gear 126 and the shaft 16, it is desirable to maintain the lead-in as small as possible.

Referring to FIG. 4, another embodiment of this invention is shown which varies from the embodiment of FIGS. 1–3 mainly in the construction of the mounting means and the output gear so that it is deemed unnecessary to discuss many other structural details of the transmission which remain the same; however, where common structural details are discussed, like reference numerals will be used.

A case assembly 213 of a transmission subassembly 211 of this embodiment includes a case portion 12 and mounting means 281 and 205 on the left and right side of the case 12 respectively. The mounting means 281 includes a bearing cap 268 and a bearing assembly 80; the bearing cap being secured to the portion of the case 12 surrounding the bore 64 by a plurality of bolts 69 and has an axially extending shaft receiving opening 270 therein bounded by an axially inwardly extending annular flange 272, which opening is adapted to receive the shaft 16. A second annular flange 274 on the bearing cap 268 extends axially inwardly therefrom and is received in the bore 64 of the case portion 12. A counterbore 276 is formed in the flange 274 and an outer race 78 of a bearing assembly 80 is pressed into the counterbore and against a shoulder 282 at the left end of the counterbore which limits the leftward movement of the race 78. An inner race 84 of the bearing assembly 80, between which and the outer race 78 is an annulus of caged tapered rollers 86, has a central axially extending shaft receiving opening 85 therein which is adapted to be pressed onto the shaft 16 to rotatably mount the shaft in the left side of the case portion 12.

The mounting means 205 includes a bearing cap 296 and a bearing assembly 110; the bearing cap being secured to the portion of the case 12 surrounding the bore 66 by a plurality of bolts 98 and has an axially extending shaft receiving opening 200 bounded by an axially inwardly extending annular flange 202, which opening is adapted to receive the shaft 16. A second annular flange 204 on the bearing cap 296 extends inwardly and is received in the bore 66. A counterbore 206 is formed in the flange 204 which receives an outer race 108 of a bearing assembly 110 and has a shoulder 212 at the right end thereof which engages the race 108 and limits movement thereof to the right. An inner race 114 of the bearing assembly 110 has a central shaft receiving opening 115 and is coaxial with and axially spaced from the race 84. The inner race 114 is adapted to be pressed on the shaft 16 and an annulus of caged tapered rollers 116 is disposed between the races 108 and 114 so that when the shaft 16 is disposed in the opening 115 it is rotatably mounted in the right side of the case portion 12.

A gear 226, having a peripheral toothed portion 227 carried by a body portion 227a including a central axially elongated hub 230 and a radially extending web 230a connecting the hub and the toothed portion, is disposed in the case assembly 213 and positioned with left and right axial ends 232 and 234 of the hub 230 in abutting engagement with the axially inner faces of the inner races 84 and 114 respectively and with a central axially extending shaft receiving opening 231 in the hub 230 disposed in a coaxial relationship with the openings 85 and 115 in the inner races.

In this embodiment no portion of the hub 230 overlies the bearing assemblies 80 and 110; however, the flanges 274 and 204 on the bearing caps 268 and 296 respectively extend axially inwardly beyond the bearing assemblies 80 and 110 and overlie the ends 232 and 234 of the hub 230 respectively. Annular peripheral flat bottomed grooves 246 and 248 are formed in the hub 230 adjacent the ends 232 and 234 thereof respectively and have pressed therein annular flanges 250 and 252 respectively. If desired, the flanges 250 and 252 may be secured to the hub 230 in other suitable fashions, or be formed integrally therewith. The flanges 250 and 252 extend radially upwardly from the hub 230 and are circumferentialy surrounded by and adapted to be radially engaged by the overlying portions of the flanges 274 and 204. Preferably, the designed radial spacing between the flanges 250 and 252 and the flanges 274 and 204 is maintained at approximately .010 to .055 inch; the minimum tolerance being greater than the minimum tolerance of .005 inch maintained in the first embodiment between the flanges 136 and 138 and the shoulders 140 and 142 of the inner races 84 and 114. This is necessary because in the first embodiment both the inner races 84 and 114 and the gear 126 were pressed on the shaft so that both the races and the gear were expanded and the races were only expanded from .003 to .005 inch; however, in this embodiment, while the gear 226 is pressed on the shaft with a preferable press fit of .007 to .009 inch, so that the hub 230 and flanges 250 and 252 carried thereby will be expanded, the flanges 274 and 204 will not be expanded so that a larger minimum tolerance is required between the flanges before the shaft 16 is inserted in the opening 231. As with the first embodiment, a greater tolerance than .055 inch may be maintained between the flanges 250 and 252 and the flanges 274 and 204; however, again such an increased tolerance will require a greater lead-in on the central opening 231 with the resulting decrease in surface contact between the hub and the shaft. A plurality of axially extending and circumferentially spaced openings 253 are provided in the flanges 250 and 252 to allow lubricant to flow past the flanges and into and out of the area of the bearing assemblies 80 and 110.

The arrangement of the various diameters on the shaft 16 and the diameters of the central openings of the inner races 84 and 114 and the gear 226 are maintained in the same relationship as in the first embodiment, and the transmission subassembly 213 is mounted on the shaft 16 in the same manner as the subassembly 13 of the first embodiment is mounted on the shaft.

Attempts have been made to assemble the prior art transmission subassembly on the axle shaft by retaining a dummy shaft in the subassembly for maintaining the gear centralized, and by pressing the subassembly on the shaft and simultaneously pushing the dummy shaft out of the subassembly ahead of the shaft. However, due to the small diameter 16a at the end of the bearing, before the proper supporting diameter of the shaft reaches the output gear, the dummy shaft has been completely removed from the subassembly allowing the gear to be greatly displaced from its desired coaxial relationship with the bearings.

Thus, with a transmission according to this invention, the transmission manufacturer can complete the subassembly 11 or 211, including inserting the proper shims at positions D and E to correctly preload the bearing assemblies 80 and 110 respectively in a well known manner, test the unit by mounting therein a dummy shaft preferably in the form of an expanding arbor (not shown), remove the dummy shaft and ship the completed subassembly to the railcar manufacturer with the assurance that such will not be disturbed by later disassembly and assembly, which, if improperly done, may result in a poorly performing unit that would reflect on the good name of and perhaps impose unwarranted warranty liability on the transmission manufacturer.

Additionally, the railcar manufacturer is saved the time, expense, and equipment necessary to disassemble and assemble the subassembly and the expense of a dummy shipping shaft as is the case with prior art devices and can merely mount the subassembly on the axle shaft by the simple method described above.

It is readily apparent that many changes and modifications can be made in the invention as shown and described herein wthout departing from the underlying scope thereof as defined by the following claims.

What is claimed is:

1. A transmission subassembly adapted to have a shaft mounted therein comprising in combination,
    (a) a case assembly having an axially extending access means therein and including a pair of axially spaced bearing means,
    (b) said access means being adapted to receive a shaft inserted into said case assembly,
    (c) said bearing means each having an axially extending shaft receiving opening therein with said openings being disposed in coaxial relationship,
    (d) a gear disposed in said case assembly and including
        (1) a peripheral toothed portion, and
        (2) a body portion carrying said toothed portion and extending radially inwardly therefrom and having an axially extending shaft receiving opening therein,
    (e) said gear being disposed intermediate said first and second bearing means and with the shaft receiving opening therein coaxial with the shaft receiving openings in said bearing means,
    (f) said gear and said bearing means being disposed in relationship to said access means so that a shaft may be inserted into said case assembly through said access means and into said coaxial shaft receiving openings,
    (g) a pair of first engaging means carried by said case assembly and disposed on opposed axial sides of said gear,
    (h) a pair of second engaging means carried by said gear at a position radially outwardly from the shaft receiving opening therein,
    (i) one of said pair of engaging means closely surrounding said other pair of engaging means and radially engageable therewith upon attempted radial movement of said gear to a position wherein the shaft receiving opening therein is not aligned with the shaft receiving opening in said bearing means, (j) whereby said shaft receiving openings are maintained in a coaxial relationship and positioned relative to said access means so that a shaft may be easily inserted therein.

2. A transmission subassembly adapted to have a shaft mounted therein comprising in combination,
(a) a case assembly including
(1) a case portion having an access means therein,
(2) a cap portion secured to said case portion and covering said access means, and
(3) bearing means having an axially extending shaft receiving opening and being carried by one of said portions,
(b) said cap portion having an opening therein adapted to receive a shaft inserted into said case assembly,
(c) a gear disposed within said case assembly and including
(1) a peripheral toothed portion, and
(2) a body poriton carrying said toothed portion and extending radially inwardly therefrom and having an axially extending shaft receiving opening therein,
(d) said bearing means and gear being disposed
(1) with the shaft receiving openings therein in a coaxial relationship, and
(2) in relationship to said cap portion opening so that a shaft may be inserted into said case assembly through said cap portion opening and into said coaxial shaft receiving openings whereby the shaft is rotatably mounted in said case assembly and said gear is mounted on said shaft,
(e) first engaging means carried by said case assembly,
(f) and second engaging means carried by said gear at a position radially outwardly from the shaft receiving opening therein,
(g) one of said engaging means closely surrounding said other engaging means and radially engageable therewith upon attempted radial movement of said gear to a position wherein the shaft receiving opening therein is not aligned with the shaft receiving opening in said bearing means,
(h) whereby said shaft receiving openings are maintained in a coaxial relationship and positioned relative to said cap portion opening so that a shaft may easily be inserted therein.

3. A transmission subassembly adapted to have a shaft mounted therein comprising in combination,
(a) a case assembly including
(1) a case portion having a first and a second access means therein disposed in opposed relationship,
(2) a first and second cap portion secured to said case portion and covering said first and second access means respectively, and
(3) a first and a second bearing means carried by at least one of the above portions and disposed in axially spaced relationship,
(b) at least one of said cap portions having an axially extending opening therein adapted to receive a shaft inserted into said case assembly,
(c) said bearing means each having an axially extending shaft receiving opening with said openings being disposed in a coaxial relationship,
(d) a gear disposed in said case assembly and including
(1) a peripheral toothed portion, and
(2) a body portion carrying said toothed portion and extending radially inwardly therefrom and having an axially extending shaft receiving opening therein,
(e) said gear being disposed intermediate said first and second bearing means and with the shaft receiving opening therein coaxial with the shaft receiving openings in said bearing means,
(f) said gear and said bearing means being disposed in relationship to said cap portion opening so that a shaft may be inserted into said case assembly through said cap portion opening and into said coaxial shaft receiving openings,
(g) a pair of first engaging means carried by said case assembly at a position radially outwardly of the shaft receiving opening in said bearing means and disposed on opposed axial sides of said gear,
(h) a pair of second engaging means carried by said gear at a position radially outwardly from the shaft receiving opening therein,
(i) one of said pair of engaging means closely surrounding said other pair of engaging means and radially engageable therewith upon attempted radial movement of said gear to a position wherein the shaft receiving opening therein is not aligned with the shaft receiving openings in said bearing means,
(j) whereby said shaft receiving openings are maintained in a coaxial relationship and positioned relative to said cap portion opening so that a shaft may easily be inserted therein.

4. A transmission subassembly adapted to have a shaft mounted therein comprising in combination,
(a) a case having a first and a second access means therein disposed in axially spaced opposed relationship,
(b) a first and a second mounting means secured to said case and covering said first and second access means,
(c) at least one of said mounting means having an opening therein operative to rotatably receive a shaft inserted through the same and into said case,
(d) said first and second mounting means including a first and second bearing assembly respectively,
(e) said bearing assemblies being disposed in axially spaced relationship and each having a central axially extending shaft receiving opening therein,
(f) said central openings being disposed in relation to said mounting means opening so that a shaft may be inserted therein and rotatably mounted relative to said case,
(g) a gear including a peripheral toothed portion and a body portion and having a central axially extending shaft receiving opening in said body portion,
(h) at least a portion of said gear being disposed axially inwardly of both of said bearing assemblies with the central opening therein being disposed coaxially and intermediate the central openings in said bearing assemblies,
(i) and engaging means a portion of which is carried by said gear body and a portion of which is carried by said mounting means,
(j) said engaging means portion being engageable for maintining said central openings in a coaxial relationship so that a shaft may be easily inserted through said mounting means opening and into said central openings.

5. A transmission subassembly according to claim 4 wherein the portion of said engaging means carried by said mounting means is disposed radially outwardly from the central openings in said bearing assemblies.

6. A transmission subassembly according to claim 5 wherein the portion of said engaging means carried by said gear body is radially engageable with the portion of said engaging means carried by said mounting means.

7. A transmission subassembly according to claim 6 wherein
(a) the portion of said engaging means carried by said gear body is a first and a second axially opposed outwardly extending flange,
(b) the portion of said engaging means carried by said mounting means is carried by said bearing assembly, and (c) said first and second flanges overlie and are radially engageable with the portion of said engaging means carried by said first and second bearing assemblies respectively.

8. A transmission subassembly according to claim 7 wherein the portion of said engaging means carried by each of said bearing assemblies is a peripheral shoulder formed thereon adjacent the axially inner end thereof.

9. A transmission subassembly according to claim 6 wherein
(a) the portion of said engaging means carried by said mounting means is an annular flange means, and
(b) said annular flange means projects axially inwardly from said mounting means and overlies and is radially engageable with the portion of said gear body.

10. A transmission subassembly according to claim 9 wherein
(a) said first and second mounting means includes a first and second bearing cap and a bearing assembly respectively,
(b) said first and second bearing caps
 (1) are secured to the portion of said case surrounding said first and second access means respectively, and
 (2) each have a counterbore which receives said first and second bearing assemblies respectively,
(c) said annular flange means are carried by each of said bearing caps at a position radially outwardly from the counterbore therein and extend axially therefrom to a position axially inwardly from the respective bearing assembly carried by the bearing cap and overlying a portion of said gear body.

11. A transmission subassembly according to claim 10 wherein,
(a) said gear body includes
 (1) a central axially elongated hub portion in which said central opening is formed,
 (2) a radially extending webbed portion joining said peripheral toothed portion to said hub portion intermediate the axial ends thereof, and
 (3) a first and a second radially extending flange means,
(b) said radially extending flange means being disposed on opposed axial sides of said web portion and extending radially from said hub portion,
(c) and said annular flange means on said first and second bearing cap closely overlie said first and second radial flange respectively.

12. A transmission subassembly adapted to have a shaft mounted therein to complete the transmission assembly comprising in combination,
(a) a case,
(b) said case having access means therein operative to rotatably receive a shaft,
(c) a pair of bearing assemblies each including inner and outer coaxial races with an annulus of anti-friction means therebetween,
(d) said inner races each having a central opening,
(e) said outer races being carried by said case and positioned so that said bearing assemblies are disposed in an axially spaced relationship and with the central openings in said inner races disposed coaxially,
(f) gear means including a body portion having a central opening,
(g) at least a portion of said body being disposed intermediate said bearing race assemblies and said central openings being disposed coaxially,
(h) means mounted in said case and drivingly connected to said gear means,
(i) and means carried by said body portion and by said bearing assemblies for maintaining said central openings substantially coaxial, (j) said bearing assemblies and gear means being disposed with respect to said access means so that a shaft may be inserted into said case through said access means and into said central opening to operatively mount said bearing assemblies and gear means on the same.

13. A transmission subassembly adapted to have a shaft mounted therein to complete the transmission assembly comprising in combination,
(a) a case,
(b) said case having access means therein operative to rotatably receive the shaft,
(c) a pair of bearing assemblies each including inner and outer coaxial races with an annulus of anti-friction means therebetween,
(d) said inner races each having a central opening,
(e) said outer races being carried by said case and positioned so that said bearing assemblies are disposed in an axially spaced relationship and with the central openings in said inner races disposed coaxially,
(f) first gear means including a peripheral toothed portion and a hub portion and said hub portion having a central opening extending axially therethrough,
(g) at least a portion of said hub being disposed axially intermediately and in abutting engagement with said inner races of said bearing assemblies and with said central openings being disposed coaxially,
(h) a second gear means mounted in said case and drivingly connected to said first gear means,
(i) and engaging means carried by said hub and engageable with a portion of said bearing assemblies for maintaining said central openings substantially coaxial,
(j) said bearing assemblies and said gear means being disposed with respect to said access means so that a shaft may be inserted into said case through said access means and into said central openings to operatively mount said bearing assemblies and gear means on the same.

14. A transmission subassembly according to claim 13 wherein said engaging means carried by said hub engages the inner races of said bearing assemblies for maintaining said central opening substantially coaxial.

15. A transmission subassembly adapted to have a shaft mounted therein to complete the transmission assembly comprising in combination,
(a) a case,
(b) said case having access means therein operative to rotatably receive the shaft,
(c) a pair of bearing assemblies each including inner and outer coaxial races with an annulus of anti-friction means therebetween,
(d) said inner races each having a central opening,
(e) said outer races being carried by said case and positioned so that said bearing assemblies are disposed in an axially spaced relationship and with the central openings in said inner races disposed coaxially,
(f) first gear means including a peripheral toothed portion and a hub portion and said hub portion having a central opening extending axially therethrough,
(g) at least a portion of said hub being disposed axially intermediately and in axial abutting engagement with said inner races of said bearing assemblies and with said central openings being disposed coaxially,
(h) a second gear means mounted in said case and drivingly connected to said first gear means,
(i) and engaging means carried by said hub at a position radially outwardly from the central opening therein and extending axially therefrom and operative to engage a portion of said bearing assemblies for maintaining said central openings substantially coaxial,
(j) said bearing assemblies and said gear means being disposed with respect to said access means so that a shaft may be inserted into said case through said access means and into said central openings to operatively mount said bearing assemblies and gear means on the same.

16. A transmission subassembly adapted to have a shaft mounted therein to complete the transmission assembly comprising in combination,
(a) a case,
(b) said case having access means therein operative to rotatably receive the shaft,
(c) a pair of bearing assemblies each including inner and outer coaxial races with an annulus of anti-friction means therebetween,
(d) said inner races each having a central opening,
(e) said outer races being carried by said case and positioned so that said bearing assemblies are disposed in an axially spaced relationship and with the central openings in said inner races disposed coaxially,
(f) first gear means including a peripheral toothed portion and a hub portion and said hub portion having a central opening extending axially therethrough,
(g) at least a portion of said hub being disposed axially intermediately and in axial abutting engagement with said inner races of said bearing assemblies and with said central openings being disposed coaxially,
(h) a second gear means mounted in said case and drivingly connected to said first gear means,
(i) an annular shoulder formed on each of said inner races adjacent the portion thereof engaging said hub,
(j) a pair of opposed flanges carried by said hub,
(k) one of said flanges extending axially from said hub and closely surrounding the annular shoulder of one of said inner races and operative to radially engage the same,
(l) the other of said flanges extending axially from said hub and closely surrounding the annular shoulder on the other of said inner races and operative to radially engage the same,
(m) whereby the axial abutting engagement of said hub and said inner races maintains the relative axial position thereof and the radial engagement of said flanges and said inner races maintain said central openings substantially coaxial,
(n) said bearing assemblies and said gear means being disposed with respect to said access means so that a shaft may be inserted into said case through said access means and into said central openings to operatively mount said bearing assemblies and gear means on the same.

17. A transmission assembly comprising in combination,
(a) a case having a first and a second bore disposed therein in opposed relationship,
(b) a first and a second bearing assembly,
(c) said first bearing assembly including first inner and outer coaxial races with an annulus of anti-friction means therebetween and said second bearing assemblies including second inner and outer coaxial races with an annulus of anti-friction means therebetween,
(d) said first and second outer races being carried by said case adjacent said first and second bore respectively,
(e) said inner races each having a central axially extending opening therein with the opening in said first inner race being of a greater diameter than the opening in said second race and with the openings in said inner races being coaxial,
(f) a gear having a central hub and peripheral gear teeth,
(g) said hub having first and second axially opposed end faces and having a central axially extending opening therein disposed coaxially with the openings in said inner races and having a diameter of a size intermediate the diameters of the openings in said inner races,
(h) each of said end faces of said hub abuttingly engaging one of said inner races,
(i) a first and a second flange carried by said hub and extending in opposed axial directions therefrom,
(j) said first flange closely surrounding a portion of said first inner race and said second flange closely surrounding a portion of said second inner race,
(k) said flanges being operative to radially engage said races which they surround and maintain said central openings in a substantial coaxial relationship,
(l) a gear mounted in said case and drivingly connected to said first gear,
(m) a first shaft extending into said case through said first bore and rotatable relative thereto and received in said central openings,
(n) said first shaft having at least
    (1) a first diameter registering with and being of a dimension slightly greater than the central opening in said first inner race whereby said first race may be pressingly mounted thereon for unitary rotation,
    (2) a second diameter adjacent said first diameter and registering with and being of a diameter slightly greater than the central opening in said gear but at least slightly less than the diameter of the central opening in said first inner race whereby said gear may be pressingly mounted thereon for unitary rotation while said first inner race may pass freely thereover, and
    (3) a third diameter adjacent said second diameter and registering with and being of a dimension slightly greater than the central opening in said second inner race but at least slightly less than the diameter of the central opening in said gear whereby said second inner race may be pressingly mounted thereon for unitary rotation while said gear and said first inner race may pass freely thereover,
(o) whereby said gear and said bearing assemblies may be assembled into said case and said shaft, commencing with its third diameter, may be inserted into said first bore and positioned in a pressingly mounted relationship with said inner races and said gear.

18. A transmission according to claim 17 wherein,
(a) a second shaft is rotatably mounted in said case and spaced from and parallel to said first shaft,
(b) said second gear is carried by said second shaft for unitary rotation therewith,
(c) said first and second gears are drivingly meshed,
(d) and one of said shafts is operative as an input shaft and the other of said shaft is operative as an output shaft,
(e) whereby said transmission is of the parallel drive type.

19. A parallel drive transmission according to claim 18 wherein,
(a) said second shaft is an input shaft,
(b) said first shaft is an output shaft in the form of an axle and includes
    (1) a first outboard portion projecting axially outwardly from said first diameter through said first bore, and
    (2) a second outboard portion projecting axially outwardly from said third diameter through said second bore,
(c) and wheels mounted on each of said outboard portions.

20. A transmission according to claim 17 wherein,
(a) an outboard portion of said first shaft projects axially from said third diameter through said second bore,
(b) said second bore is sufficiently larger than said shaft so that an opening exists therebetween and means may be inserted into said opening and surrounding said shaft and projecting through said second bore and may engage the axially outer portion of said second inner race to induce an axial pressing load on said second inner race and therethrough to said gear and through the latter to said first inner race whereby said inner races and said gear may be pressed on said shaft.

References Cited by the Examiner
UNITED STATES PATENTS
2,166,166  5/1938  Christian _____ 74—421

DAVID J. WILLIAMOWSKY, *Primary Examiner.*
DON A. WAITE, *Examiner.*
L. H. GERIN, *Assistant Examiner.*